INVENTOR
DEREK JOHN DEAN

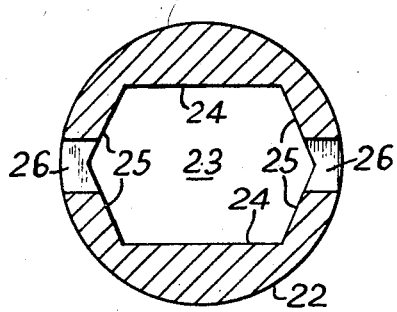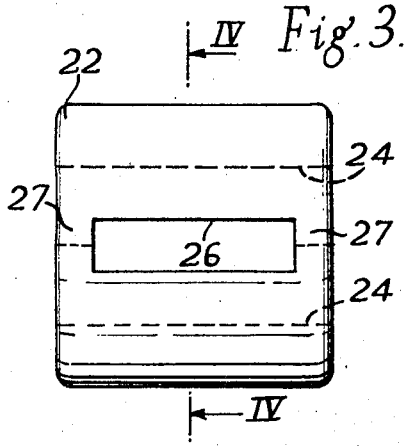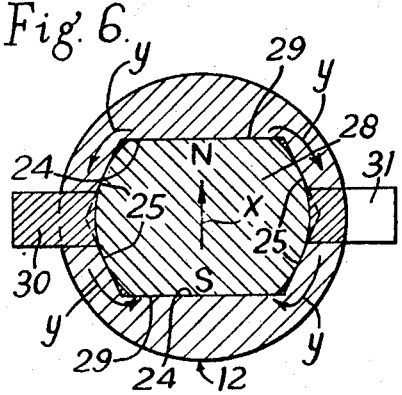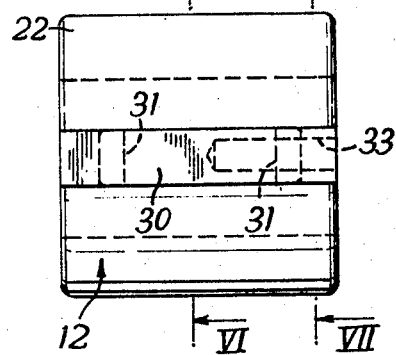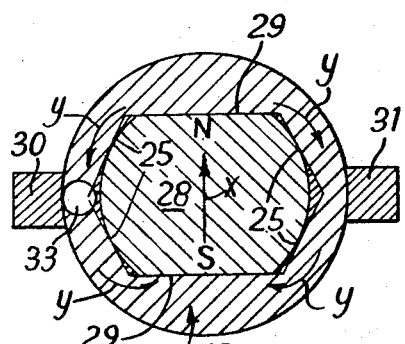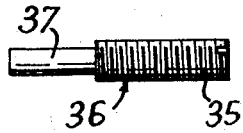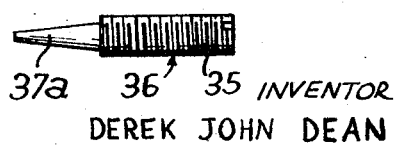
INVENTOR
DEREK JOHN DEAN
ATTORNEY 3,434,054
MOVING COIL ELECTRICAL INSTRUMENT HAVING A MAGNETIC SHUNT MOVABLE TRANSVERSELY IN A FLUX LEAKAGE PATH
Derek John Dean, Pottersbar, Middlesex, England, assignor, by mesne assignments, to Weston Instruments, Inc., Newark, N.J., a corporation of Delaware
Filed Sept. 23, 1964, Ser. No. 398,673
Claims priority, application Great Britain, Sept. 27, 1963, 38,232/63
U.S. Cl. 324—151        7 Claims
Int. Cl. G01r 1/16

This invention relates to moving coil electrical measuring instruments and is more particularly concerned with that type of such instruments in which a fixed cylindrical core located within the moving coil comprises a permanent magnet for providing the necesasry magnetic flux in the magnetic flux system which includes the arcuate flux gap or gaps within which the moving coil operates.

In other known types of moving coil instrument such as that in which a U- or C-shaped permanent magnet is provided at each pole-forming end with a pole piece having a part-cyindrical concave surface shaped to define, in conjunction with the similar surface on the opposing pole piece, the outer polar surfaces of the arcuate flux gaps for the moving coil, it is well known to provide means for shunting part of the flux provided by the permanent magnet directly from one pole piece to the other by way of a path which does not pass through the operative flux gap. Such shunting means are usually adjustable and may take the form of a small slotted piece of soft iron secured by a screw on one pole piece and adjustable backwards and forwards in its degree of projection towards the opposite pole piece. By means of such adjustable diversion of a small part of the magnetic flux provided by the permanent magnet it is possible to alter the effective flux value existing in the arcuate flux gap or gaps for the purpose of adjusting the sensitivity of the instrument to conformity with a given value.

The provision of equivalent means for adjusting the effective flux value in instruments of the type having a central core which includes a permanent magnet as the flux source has so far presented a problem of great difficulty and complexity and it is one object of this invention to provide a relatively simple and inexpensive solution to this problem.

Broadly in accordance with the invention the central core of the instrument is of the general form described in United Kingdom patents, Nos. 658,125, 838,056 and 968,275 and comprises a permanent magnet block located within a surrounding pole-forming member of ferromagnetic material which, in a diametral plane thereof lying substantially at right angles to the diametral axis of magnetisation by the permanent magnet, has regions of reduced cross section for the purpose of increasing the reluctance of the shunting or leakage paths provided thereby between the opposing poles of the permanent magnet and at least one of said regions is provided with an aperture arranged still further to increase the reluctance of such leakage path therethrough and an adjustable ferromagnetic slug or equivalent element is arranged to be movable into and out of said aperture so as to alter the amount of reluctance increase and thereby to alter the amount of diverted magnetic flux and to effect corresponding change of the value of the effective flux provided by the permanent magnet within the arcuate flux gap or gaps.

In order that the nature of the invention may be readily understood one particular constructional embodiment thereof will now be described by way of illustrative example only and with reference to the accompanying drawings in which:

FIGURE 3 is a side elevational view of the pole-forming member of the central core prior to its assembly with the permanent magnet.

FIGURE 4 is a transverse cross-sectional view taken on the line IV—IV of FIG. 3.

FIGURE 5 is a side elevational view similar to FIG. 3 of the completed core subsequent to the insertion of the magnet and the formation of further mounting lugs thereon.

FIGURE 6 is a transverse cross-sectional view similar to FIG. 4 taken on the line VI—VI of FIG. 5.

FIGURE 7 is a further transverse cross-sectional view taken on the line VII—VII of FIG. 5.

FIGURE 8 is a view of one form of adjustable slug member, while

FIGURE 9 is a view of an alternative form of adjustable slug member.

Figure 1:
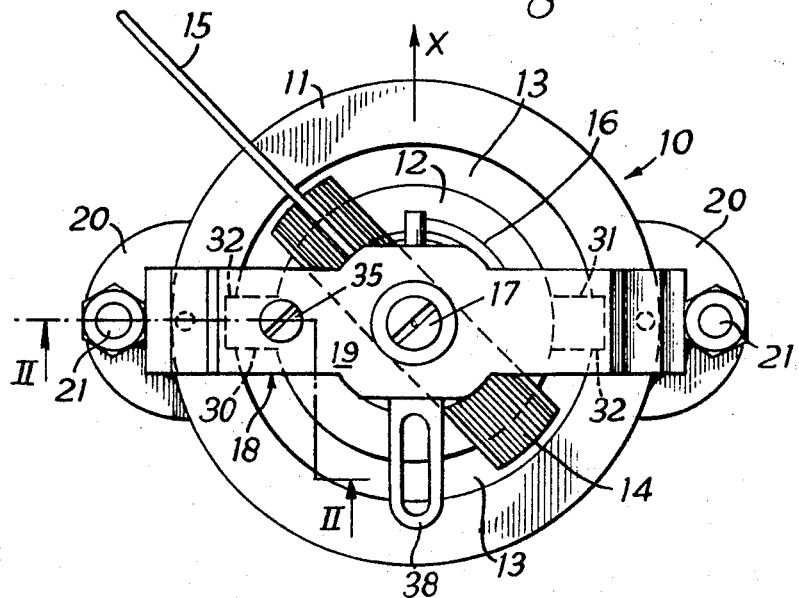
FIGURE 1 is a front elevational view of a moving coil instrument embodying the present invention.
Figure 2:
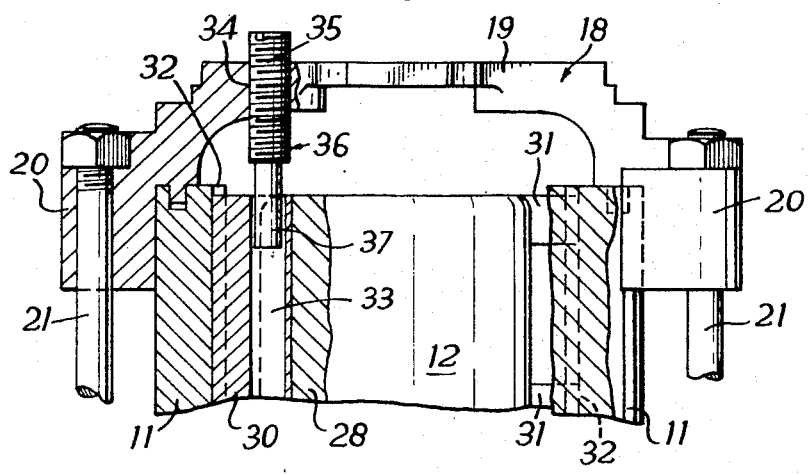
FIGURE 2 is a fragmentary side elevational view of part of the instrument of FIG. 1, the moving coil and its pivotal mounting means being removed and certain parts being broken away in section approximately along the line II—II of FIG. 1.

Referring first to FIGS. 1 and 2 the moving coil instrument indicated generically at 10 comprises a cylindrical yoke ring 11 of non-retentive ferromagnetic material, e.g., soft iron, coaxially within which is disposed a central core 12 of generally cylindrical shape which central core includes a permanent magnet arranged to magnetise the said core in the diametral plane indicated by the line $x$ in FIG. 1. Embracing the central core with its side limbs movable in the arcuate flux gaps 13 formed between the inner surface of the yoke ring 11 and the outer surface of the central core 12 is a moving coil 14; this is of conventional construction and comprises central pivots secured at the centre of each of its two end limbs as well as an attached radial pointer arm 15 and control springs 16.

The moving coil 14 is supported for rotational movement about an axis coincident with that of the core 12 by suitable jewel or other bearing means associated with fixed pivot screws of which one is shown at 17; each of these pivot screws is carried at the centre point of an associated bridge member of which one is shown at 18. These bridge members each comprise a central bridge arm 19 extending diametrally across the adjacent end of the yoke ring 11 and terminating at each end in mounting blocks 20 which have opposing arcuate surfaces adapted snugly to engage the outer surface of the yoke ring and which are also bored to receive clamping bolts 21 passing between the two bridge members to hold the latter tightly seated one on each end of the yoke ring. A zero adjuster 38 of conventional form is mounted on each bridge arm for rocking movement about the rotational axis of the moving coil and has a radial lug thereof secured to the outer end of the associated control spring 16.

Referring now more particularly to FIGS. 3–7, the central core 12 comprises an outer pole-forming member 22 which has a cylindrical outer surface and a central axially directed bore 23 provided with opposing parallel plane surfaces 24 which are interconnected at each side by further pairs of plane surfaces 25. In the diametral plane which lies parallel with the opposing surfaces 24 the member 22 is additionally slotted for the greater part of its length as shown at 26 in FIGS. 3 and 4 so as to leave only two junction regions 27 of relatively small cross-sectional area at each end of the member.

The permanent magnet 28 is in the form of a generally cylindrical block having parallel flattened surfaces 29 on opposite sides and dimensioned to fit snugly within the bore 23 of the pole-forming member with the said flattened surfaces 29 in contact with the opposing surfaces 24 of the member 22. The permanent magnet block 28 is magnetised, as indicated by arrow $x$, so that its magnetic axis is diametral and is at right angles to the said surfaces 29.

After insertion of the permanent magnet within the surrounding pole-forming member it is secured therein by means of injected die-cast metal which, in addition to filling the spaces between the flat surfaces 25 and the curved outer surfaces of the magnet block, also fills each of the two slots 26 and is arranged to provide diametral opposed radially projecting securing ribs or lugs as shown at 30 and 31. One of these, the rib 30, extends throughout the axial length of the central core whereas the others comprise two end lugs 31 only.

Referring again to FIGS. 1 and 2, the inner surface of the yoke ring 11 is provided in the same diametral plane as the bridge members 18 with axially directed recesses 32 arranged snugly to receive the projecting rib 30 and the two lugs 31 formed on the central core thereby to locate such core accurately in position within the yoke ring. Although not shown as it forms no part of the invention, such core is secured in position by means such as a clamping screw or screws carried in the yoke ring and acting to engage the core in between the two separate locating lugs 31 on one side.

Referring more particularly to FIGS. 3, 5, 6 and 7 it will be seen that the four small cross-section connecting regions 27 of the pole-forming member 22 lying at each end of the two slots 26 therein necessarily constitute leakage paths, as indicated by the arrows $y$, for flux from the permanent magnet 28 which avoids passage across the arcuate flux gaps 13 into the yoke ring 11. The present invention utilizes the existence of these leakage flux paths as a means of effecting a limited degree of controlled alteration of the effective flux in the arcuate flux gaps by providing for variation of the reluctance of at least one of the leakage paths through said regions.

This is effected by the provision, as by drilling, of an aperture in the form of a constant diameter circular section hole or recess 33 parallel with the axis of the central core and at a position so as effectively to sever one of the said reduced section regions 27 of the pole-forming member 22 as shown more particularly in FIG. 7. By such effective severance the reluctance of the leakage path through that particular region 27 is materially reduced.

Referring now more particularly to FIG. 2 one of the bridge members 18 is provided at a position in alignment with the axis of the hole 33 with a tapped hole 34 for the reception threin of the threaded region 35 of a movable slug 36 which is of nonretentive ferromagnetic material, such as soft iron, and is provided with a reduced diameter inner end 37 adapted to enter within the hole 33. A screw-driver slot or other means is provided on the outer end of the slug 36 to allow adjustment of its position, relative to the hole 33.

By adjusting the position of the inner end 37 of the slug 36 with relation to the hole 33 so the effect of the hole in reducing the amount of magnetic flux leakage may be partly or substantially wholly neutralised thereby permitting adjustment of the effective reluctance of the one leakage path through the region 27 having the hole 33 and correspondingly altering the amount of active flux present in the arcuate flux gaps 13.

If desired similar slug or reluctance adjusting members may be provided at one or more of the remaining three of the reduced cross-section areas 27 of the pole-forming member 22 to permit a greater range of flux adjustment. Instead of being of constant diameter circular section as shown, the inner, hole-entering inner end of the adjusting slug 36 may be made conical or frusto-conical as shown at 37a in FIG. 9 to alter the law connecting the rotational movement thereof with the extent of flux adjustment provided. Similarly, the hole 33 may be of tapered or conical form while instead of employing a screw adjustment a suitable slide or other form of displacement may be used.

While the invention has been described with relation to a moving coil instrument having a particular form of central permanently magnetised core, it will be obvious to those skilled in the art that the basic idea of controlling the reluctance of a leakage path within the central core as a means of diverting a variable amount of leakage flux for active use in the arcuate flux gaps of the instrument may be applied to other forms of construction.

I claim:
1. A moving coil type electrical measuring instrument which includes a pivotally mounted coil winding, a generally cylindrical stationary central core within said movable coil winding and having an axis parallel to the axis of coil winding rotation, said central core including a permanent magnet arranged to magnetise said core in a diametral plane and a stationary yoke ring surrounding said coil winding, said yoke ring and said central core having opposed arcuate surfaces which define two diametrically opposed arcuate flux gaps within which said coil winding can operate, said central core comprising a pole-forming member of magnetic material surrounding said permanent magnet and having regions of magnetic material which are of reduced cross sectional area in the diametral plane lying at right angles to said magnetisation plane, said regions providing a flux leakage path within said core between opposite poles of said permanent magnet, said pole-forming member including an elongated aperture which extends into at least one of said regions disposed with its longitudinal axis parallel to the axis of said central core and an adjustable position slug of magnetic material movable axially into and out of said aperture to alter the reluctance of the leakage path through said region thereby to alter the value of effective flux from said permanent magnet present in said arcuate flux gaps.

2. A moving coil electrical measuring instrument according to claim 1 in which said aperture is of circular section.

3. A moving coil electrical measuring instrument according to claim 2 in which said aperture is of constant diameter throughout its length.

4. A moving coil electrical measuring instrument according to claim 3 in which said slug includes an aperture-entering portion of constant diameter circular section.

5. A moving coil electrical measuring instrument according to claim 4 in which said slug includes an aperture-entering portion of conical shape.

6. A moving coil electrical measuring instrument according to claim 1 in which said slug includes a screw-threaded stem portion.

7. A moving coil electrical measuring instrument according to claim 6 which includes a stationary bridge piece carrying pivot means for said movable coil winding and which is provided with a screw-threaded aperture receiving said stem portion of said slug.

References Cited

UNITED STATES PATENTS

| | | | |
|---|---|---|---|
| 2,607,812 | 8/1952 | Lederer | 324—151 |
| 2,719,267 | 9/1955 | Kunz et al. | 324—151 |
| 2,816,255 | 12/1957 | Greif. | |
| 2,836,796 | 5/1958 | Millar et al. | 324—151 |
| 2,959,736 | 11/1960 | Lunas | 324—150 |

RUDOLPH V. ROLINEC, *Primary Examiner.*

G. R. STRECKER, *Assistant Examiner.*